United States Patent
Sheehan et al.

[11] Patent Number: 6,036,415
[45] Date of Patent: Mar. 14, 2000

[54] SPINDLE FOR GRIPPING AND CLOSING A MOUNTING MEMBER

[75] Inventors: Brian C. Sheehan; Terry M. Sheehan; Dan P. Soroka, all of Elmira, N.Y.

[73] Assignee: Hardinge, Inc., Elmira, N.Y.

[21] Appl. No.: 09/148,161

[22] Filed: Sep. 4, 1998

[51] Int. Cl.[7] .................................................. B23B 31/10
[52] U.S. Cl. .......................................... 409/231; 279/4.08
[58] Field of Search .................................. 279/4.07, 4.08, 279/4.09, 51; 409/231, 232, 233, 234; 408/239 R, 240

[56] References Cited

U.S. PATENT DOCUMENTS

| | | | |
|---|---|---|---|
| 3,633,457 | 1/1972 | Reeber | 409/233 |
| 3,640,147 | 2/1972 | Fantoni | 72/424.8 |
| 3,659,863 | 5/1972 | Buttner . | |
| 3,868,886 | 3/1975 | Bondie | 409/233 |
| 3,924,514 | 12/1975 | Parsons et al. . | |
| 3,927,583 | 12/1975 | Parsons et al. . | |
| 3,961,800 | 6/1976 | Peterson et al. . | |
| 4,273,199 | 6/1981 | Blanz . | |
| 4,303,360 | 12/1981 | Cayen et al. | 409/233 |
| 4,411,568 | 10/1983 | Rohm | 409/233 |
| 4,635,342 | 1/1987 | Balding . | |
| 4,762,447 | 8/1988 | Marantette | 279/4.08 |
| 4,869,626 | 9/1989 | Kosmowski | 409/231 |
| 4,884,899 | 12/1989 | Schwartzman . | |
| 5,010,794 | 4/1991 | Klager | 82/147 |
| 5,025,652 | 6/1991 | Bielfeldt . | |
| 5,039,261 | 8/1991 | Takada | 409/233 |
| 5,078,558 | 1/1992 | Arai et al. | 409/233 |
| 5,096,213 | 3/1992 | Terwilliger et al. . | |
| 5,096,347 | 3/1992 | Kumagai et al. | 409/233 |
| 5,104,237 | 4/1992 | Slocum . | |
| 5,221,098 | 6/1993 | Ayzenshtok et al. . | |
| 5,281,032 | 1/1994 | Slocum . | |
| 5,293,940 | 3/1994 | Hromas et al. . | |
| 5,325,749 | 7/1994 | Peris et al. . | |
| 5,431,416 | 7/1995 | Thornton | 279/4.08 |
| 5,533,814 | 7/1996 | Slocum . | |
| 5,570,980 | 11/1996 | Nakamura et al. | 409/232 |
| 5,700,092 | 12/1997 | Wasson et al. . | |

FOREIGN PATENT DOCUMENTS

| | | | |
|---|---|---|---|
| 213075 | 3/1987 | European Pat. Off. | 279/4.07 |
| 3804963 | 7/1989 | Germany | 279/4.07 |

*Primary Examiner*—Daniel W. Howell
*Attorney, Agent, or Firm*—Pillsbury Madison & Sutro LLP

[57] ABSTRACT

A spindle for gripping and closing a mounting member which includes a housing having a spindle assembly mounted therein including a first rotary member capable of rotation about its longitudinal axis and a second rotary member disposed about the first rotary member in coaxial relation and being capable of rotation about the longitudinal axis. The first rotary member has a gripping portion for gripping the mounting member and the second rotary member has a thrust surface and a contacting portion for contacting the mounting member. A radial bearing in the housing supports the second rotary member, and a fluid thrust bearing supports the thrust surface of the second rotary member. One of the first and second rotary members is capable of axial movement relative to the other rotary member and has an engagement surface engageable for causing axial movement of the axially moveable rotary member. An actuating assembly is provided to selectively engage the engagement surface to move the axially movable rotary member relative to the other rotary member to draw the mounting member against the contacting surface for closure.

25 Claims, 7 Drawing Sheets

SPINDLE FOR GRIPPING AND CLOSING A MOUNTING MEMBER

BACKGROUND OF THE INVENTION

1. Field of the Invention

The present invention relates to spindles and, in particular, to a spindle for gripping and closing a mounting member.

2. Description of the Related Art

Spindles are widely used for providing rotary motion to workpieces and/or tools in many applications, including tool making, machining, and general industrial production. Ordinarily, a mounting member such as a slotted collet or the like will be provided for mounting the workpiece or tool to be rotated on the spindle. The spindle must, therefore, include some provision for gripping and closing the mounting member to hold the workpiece or tool, and this requirement is typically met by providing a drawbar threaded to engage the mounting member or collet. The drawbar can then be moved along its axis to draw the collet against a tapered contacting surface and thereby contract the slotted collet around the workpiece or tool to hold it securely.

In order to improve the performance of spindles, fluid bearings, which are also known as hydrostatic bearings, have been used to an extent to enable higher maximum RPMs and to increase reliability. Fluid thrust bearings provide high dynamic stability and accuracy in applications where axial forces are present. In addition, fluid bearings may permit the use of water and other advantageous fluids as lubricants, which reduces the environmental problems and fire hazards created through use of typical oil-type lubricants.

Heretofore known spindles with fluid thrust bearings have, however, not included satisfactory capability for drawbar-operated closing of mounting members as described above, which requires that the drawbar be movable axially so as to draw the mounting member against the tapered contacting surface. The combined capability of rotary and axial movement has proven difficult to advantageously achieve in spindles with fluid bearings.

Moreover, many known spindles are driven by a drive-belt arrangement in which the drive motor is positioned remote from the spindle. Such an arrangement may have disadvantages in that the belt adds additional inertial drag to the spindle, thereby reducing the ability of the spindle to accelerate quickly to a desired speed, or to decelerate when desired. Moreover, failure of the belt will, of course, render the spindle inoperable until repairs can be made, and the maximum speed capacity of the belt also limits the overall performance of the spindle. Integral drive motors, which drive a spindle or shaft directly without the need for a belt to transmit driving force, provide many advantages over a drive-belt arrangement, including quicker acceleration, faster response to control inputs, and the device driven by the motor. The advantages of integral drive motors, which eliminate drive belts, have not been fully realized in a spindle having a fluid bearing.

Thus, a need exists for a spindle which includes a fluid thrust bearing which can also grip and close a mounting member, thereby increasing the performance of the spindle and also allowing it to be used in typical applications requiring a workpiece or a tool to be mounted in the mounting member. In addition, a need exists for such a spindle which includes an integral drive motor.

SUMMARY OF THE INVENTION

It is an object of the present invention to provide a spindle which combines the advantages of a fluid thrust bearing with the capability of gripping and closing a mounting member.

In accordance with the present invention, a spindle is provided for gripping and closing a mounting member and includes a housing having a spindle assembly mounted therein. The spindle assembly includes a first rotary member capable of rotation about its longitudinal axis and a second rotary member disposed about the first rotary member in coaxial relation which is also capable of rotation about the longitudinal axis. The first rotary member has a gripping portion for gripping the mounting member, and the second rotary member has a thrust surface and a contacting portion for contacting the mounting member.

A radial bearing in the housing supports the second rotary member for rotational movement, and a fluid thrust bearing axially supports the thrust surface of the second rotary member.

One of the first and second rotary members is capable of axial movement relative to the other of the rotary members, and has an engagement surface engageable for causing axial movement of the one rotary member. An actuating assembly is constructed and arranged to selectively engage the engageable surface to move the axially moveable one of the rotary members axially relative to the other of the rotary members to draw the mounting member against the contacting surface for closure.

Preferably, a drive motor is disposed in the housing for driving the spindle assembly and has a first drive member attached to the second rotary member for rotational movement therewith and a second drive member mounted in the housing.

In a preferred embodiment, the radial bearing is a self-compensating hydrostatic bearing. The first rotary member may advantageously be a through-hole drawbar and the axially movable one of the rotary members, and the second rotary member may advantageously be a spindle shaft. A pair of engagement surfaces may be provided, and the engagement surfaces may advantageously be formed on an annual flange. The actuating assembly may advantageously be a fluid pressure piston assembly. A locking member may be arranged for locking the second rotary member and the mounting member for unitary rotational movement.

The drawbar may advantageously include a flange on which the engagement surfaces are formed, and the actuating assembly may include a sleeve releasably attached to the spindle. The sleeve may define a recess for receiving the flange therein for a range of movement within the recess, with the sleeve further defining a closing port for supplying fluid to the recess for moving the flange in a mounting member closing direction, and an opening port for supplying fluid to the recess for moving the flange in a mounting member opening direction. A plurality of closing ports and opening ports may be provided, and the closing ports may be disposed in relation to the opening ports in a radially staggered orientation.

The spindle of the present invention thus includes a hydrostatic thrust bearing which provides a high level of performance and reliability, while the axially movable rotary member and actuating assembly provide the advantage of permitting the mounting member to be positively closed. In addition, the integral drive motor eliminates the need for a belt drive where appropriate and enhances acceleration and responsiveness of the spindle. Further advantages are provided by the preferred through-hole drawbar, which allows lengthy workpieces to be mounted with a portion extending through the drawbar, thereby increasing the range of stock which may be held in the mounting member.

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of the specification, wherein like reference numerals designate corresponding parts in the various figures.

DETAILED DESCRIPTION OF THE PRESENTLY PREFERRED EXEMPLARY EMBODIMENT

Figure 1A:
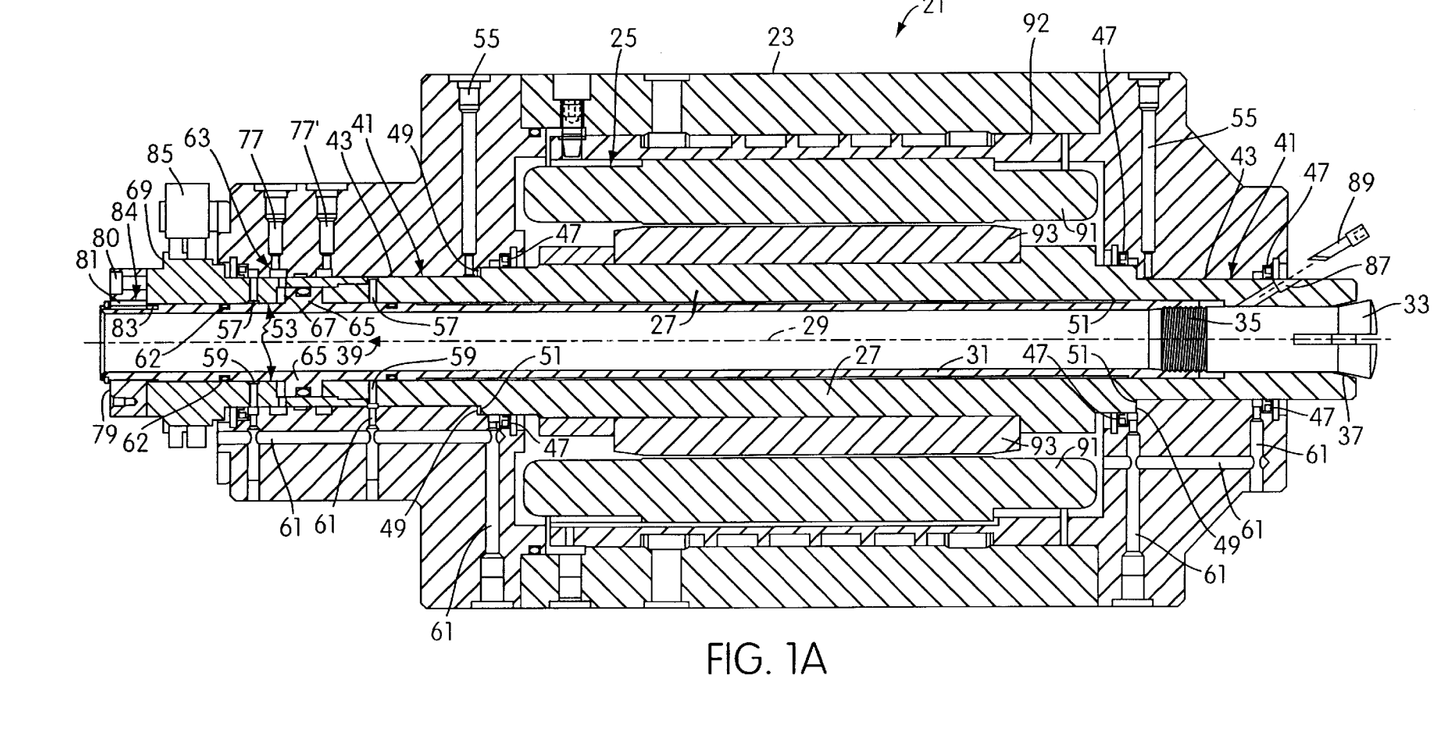
FIG. 1A is a cross-sectional view of a spindle provided in accordance with the present invention with a mounting member in the open position.

As shown in FIG. 1, a preferred embodiment of a spindle for gripping and closing a mounting member in accordance with the present invention is designated generally by the reference character 21. The spindle 21 includes a housing 23 in which is mounted an electric integral spindle drive motor 25, which will be described in more detail presently.

A hollow spindle shaft 27 is supported within the housing 23, as will be described shortly, for rotation about its longitudinal axis 29. Received within the hollow spindle shaft 27 is a hollow through-hole drawbar 31 which is supported for rotation about the longitudinal axis 29 and, as will again be described shortly, for axial movement relative to the spindle shaft 27. The drawbar 31 therefore forms a first rotary member, and the spindle shaft 27 forms a second rotary member disposed about the drawbar 31 in coaxial relation thereto, and together the drawbar 31 and the spindle shaft 27 form a spindle assembly.

A mounting member in the form of a slotted collet 33 is threadedly engaged in a threaded gripping portion 35 of the drawbar 31 and received adjacent a tapered contacting surface portion 37 of the spindle shaft 27. The slotted collet 33 is configured to receive and hold a workpiece or tool (not shown) in its central aperture (not shown) so that the workpiece or tool can be rotated by the spindle for machining operations or for other purposes. The collet 33 is shown in FIG. 1A in the open position, in which the workpiece or tool can be mounted in or removed from the collet 33, and will not be held securely.

The hollow interior of the through-hole drawbar 31 permits lengthy workpiece stock to be positioned within the collet 33 and the spindle 21 of the present invention, permitting a variety of sizes and configurations of workpieces to be mounted in the spindle 21. The slotted configuration of the collet 33 permits the collet to contract tightly around the workpiece or tool held therein when the collet is drawn against the tapered contacting portion 37 for closure in the direction shown by arrow 39, as will be explained presently.

The spindle shaft 27 is mounted for rotation within radial fluid bearings 41, which provide a thin film of pressurized fluid, such as water, oil, or other liquids or gases, between the spindle shaft 27 and bearing surfaces 43. Circumferential 45 grooves formed in the spindle shaft 27 assist in the distribution of the lubricating fluid in fluid bearing grooves 47 (see FIGS. 2, 2A, and 2B) across the bearing surfaces 43.

Annular seals 47 maintain the pressurized film of lubricating fluid generally within the radial fluid bearings 41 so that the bearings may continue to provide support to the spindle shaft 27. The seals 47 are preferably high speed shaft seals, and are mounted by appropriate arrangement, such as threaded fasteners (not shown) engaged within bores (not shown).

The radial fluid bearings 41 are, in the preferred embodiment illustrated, self-compensating hydrostatic bearings such as are well-known to those of skill in the art, as in U.S. Pat. No. 5,281,032 to Slocum. However, it should be noted that it is within the scope of the present invention for the spindle shaft 27 to be supported by radial bearings of any appropriate type, such as roller bearings, ball bearings, or the like.

The spindle shaft 27 has thrust surfaces 49 formed thereon to assist the spindle shaft 27 in resisting undesired axial displacement. The thrust surfaces 49 are supported by fluid thrust bearings 51 to provide a high degree of dynamic stability and accuracy.

The drawbar 31 is supported within the interior of the spindle shaft 27 for axial movement relative to the spindle shaft 27. A radial clearance gap 53 separates the drawbar 31 and the spindle shaft 27. Fluid for the radial fluid bearings 41 and the fluid thrust bearings 51 is supplied through fluid supply passages 55 from a source (not shown), and drawbar fluid supply passages 57 permit the fluid to drain through the radial gap 53. Drawbar fluid drain passages 59 provide for draining of the fluid from the radial gap 53, while fluid drain passages 61 permit the fluid from bearings 41, 51 to be drained from the housing 23. Drawbar O-ring seals 62 restrict axial movement of the fluid out of the radial gap 53.

An actuating assembly in a preferred form of a hydraulic piston assembly 63 is positioned about a flange 65 formed on the drawbar 31. The flange 65 has two opposed engagement surfaces 67', 67 (see FIG. 3B). The hydraulic piston assembly 63 includes a sleeve 69 which is threadedly attached to the spindle shaft 27. The sleeve 69 defines a chamber 71 (see FIG. 3B) for receiving the flange 65, and is configured to permit a range of axial movement of the flange 65. Opening ports 73 (see FIG. 3B) are formed in the sleeve 69 for supplying hydraulic fluid under pressure to the chamber 71, to thereby engage the engagement surface 67 with increased fluid pressure to axially move the flange 65 and the drawbar 31 to a position which the collet 33 is open (as illustrated in FIG. 1A). Closing ports 75 (see FIG. 5A) are formed in the sleeve 69 for providing pressurized hydraulic fluid into the chamber 71 for engaging the engagement surface 67' with increased fluid pressure to axially move the flange 65 and the drawbar 31 to a collet closed position (see FIG. 1B).

A fluid passage 77 is formed in the housing 23 for providing pressurized hydraulic fluid to the opening ports 73 from a pressurized fluid source (not shown), as is conventional in the field. A fluid passage 77' is formed in the housing 23 for providing pressurized hydraulic fluid to the closing ports 75 from the fluid source.

It should be noted that it is within the scope of the present invention for the actuating assembly to be in form of a pneumatic or other fluid pressure actuating assembly, a mechanical actuating assembly, an electrically-operated actuating assembly, or the like.

A knob 79 is releasably attached to the sleeve 69 by threaded fasteners 80 for unitary rotational movement with the sleeve 69 and the spindle shaft 27. A slide key 81 is engaged in a groove 83 formed in the drawbar 31 and a corresponding groove 84 in the knob 79 to lock together the drawbar 31 and the knob 79 for unitary rotational movement while permitting relative axial movement therebetween. The threaded fasteners 80 can be removed, thus allowing the knob 79 and the drawbar 31 to rotate independently of the sleeve 69 and the spindle shaft 27. An operator can then grip the knob 79 for manual turning of the drawbar 31 for engaging or disengaging the collet 33 in the threaded drawbar portion 35. A conventional feedback device 85, which does not form part of the present invention, is mounted on the housing 23 to sense and monitor movement of the sleeve 69 and, thereby, the spindle shaft 27, as is well-known in the art.

Figure 1B:
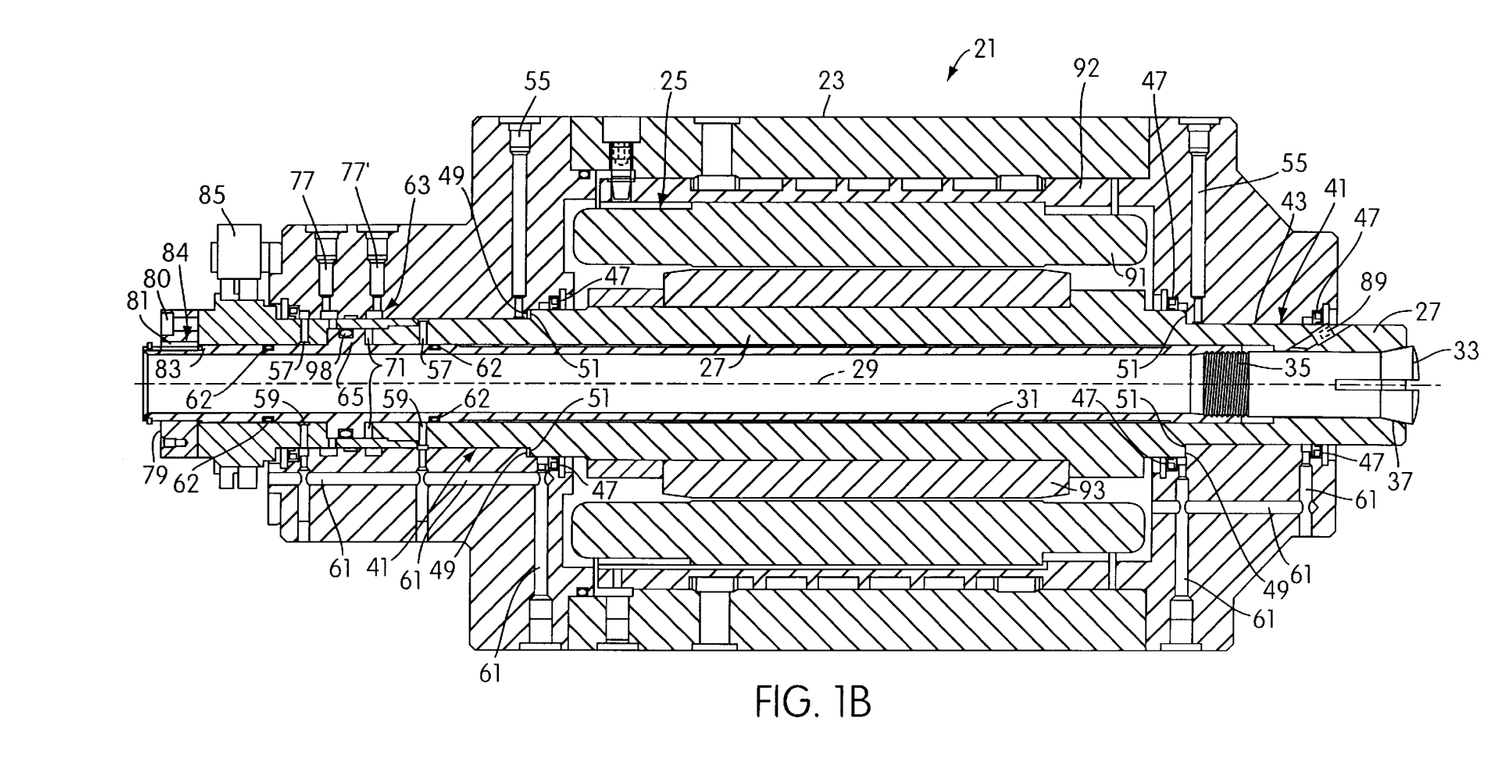
FIG. 1B is a view similar to FIG. 1A showing the mounting member in a closed position.

A collet key bore 87 is formed in the housing 23 to permit a locking member in the preferred form of a collet key 89 to be threadedly engaged therein for locking of the spindle shaft 27, the drawbar 31 and the collet 33 together for rotational movement (see FIG. 1B). The electric integral spindle drive motor 25 includes a stator 91 fixed within a cooling jacket 92 mounted in the housing 23, and a rotor 93 attached to the spindle shaft 27 for rotation therewith. The drive motor 25 is wired in a conventional manner for operation.

In FIG. 1B, the spindle 21 of the present invention is shown with the drawbar 31 moved to the closed position so as to draw the collet 33 against the contacting portion 37 of the spindle shaft 27, thereby closing the collet for secure gripping of a work piece or tool (not shown). The flange 65 has been displaced within the chamber 71 of the hydraulic piston assembly 63 to cause the above-mentioned movement of the drawbar 31.

Figure 2:
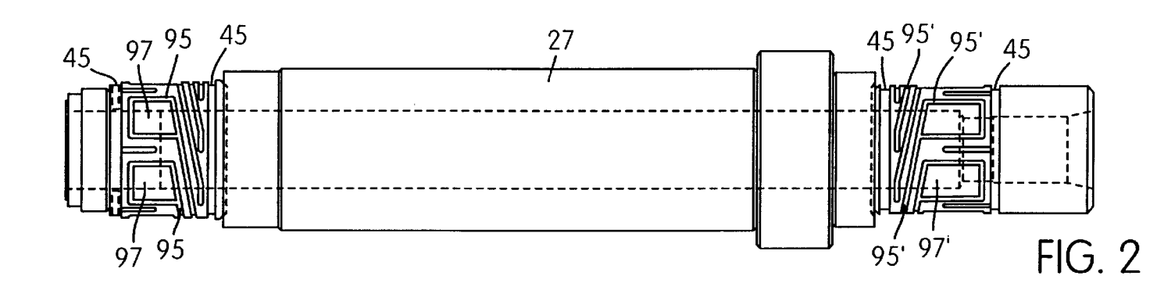
FIG. 2 is an elevational view of the spindle shaft of the present invention showing fluid bearing channels formed on cylindrical surfaces of the spindle shaft.

The spindle shaft 27 is shown in FIG. 2 with the circumferential grooves 45 adjacent hydrostatic fluid channels 95, 95' which extend in a generally circumferential and generally axially pattern about the spindle shaft 27, and have corresponding land portions 97, 97' associated with them. Hydrostatic fluid will be supplied through the fluid supply passages 55 (see FIG. 1A) into the circumferential grooves 45, and then distributed into the fluid channels 95, 95' and across the land portions 97, 97' all to provide hydrostatic fluid between the spindle shaft 27 and the bearing surfaces 43 so as to support the spindle shaft 27 for axial rotation, as is well-known in the art.

Figure 2A:
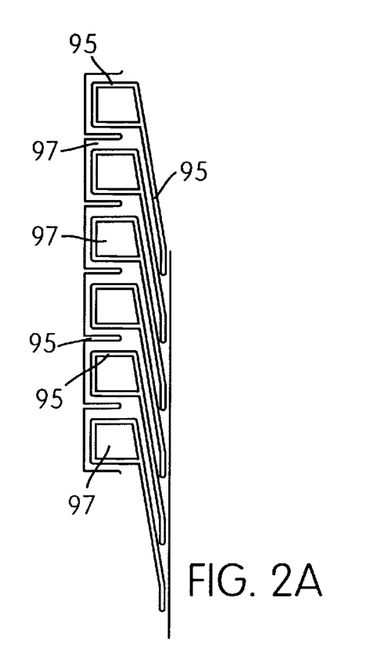
FIGS. 2A and 2B are flat projections (unwrapped) of the fluid bearing channels of FIG. 2.
Figure 2B:
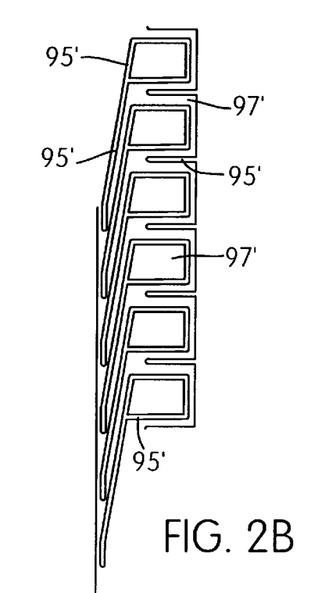

FIG. 2A depicts the hydrostatic fluid channels 95 in a flat projection "unwrapped" from the cylindrical surface of the spindle shaft 27, and FIG. 2B depicts the hydrostatic fluid channels 95' in a like projection.

Figure 3A:
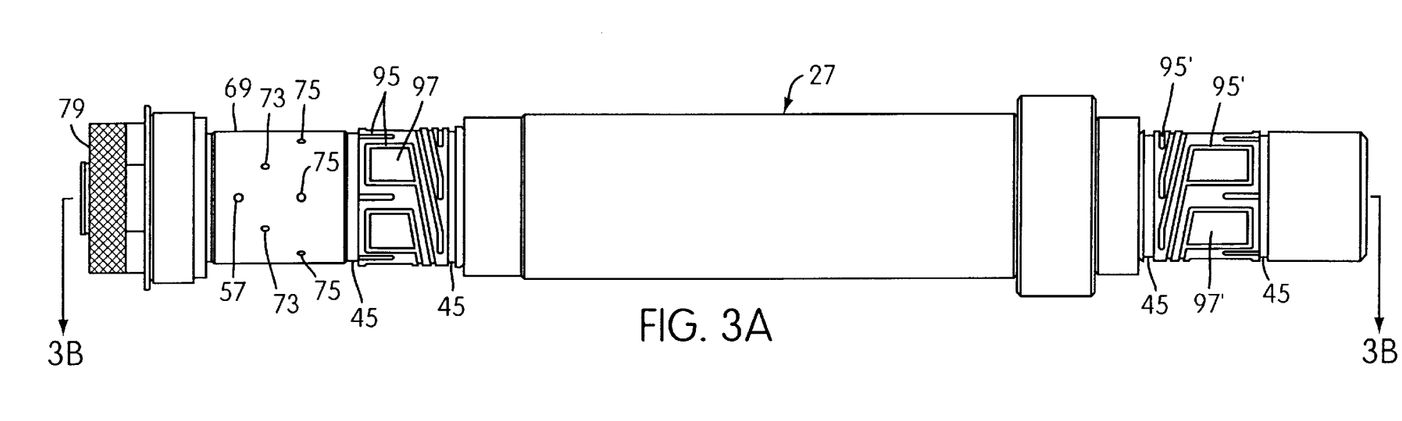
FIG. 3A is an elevational view of a spindle assembly in accordance with the present invention with a sleeve attached thereto.
Figure 3B:
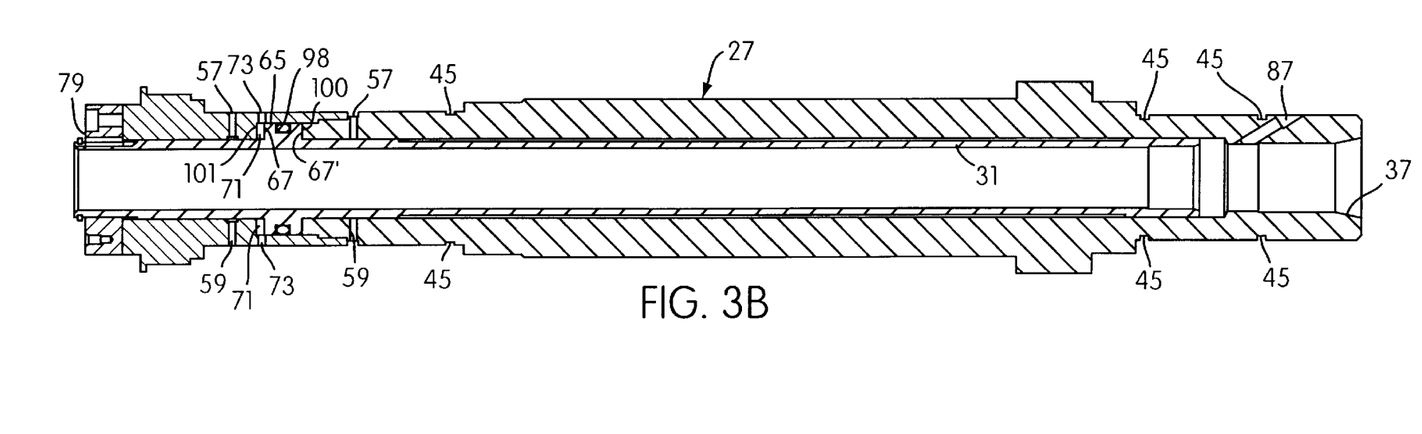
FIG. 3B is a cross-sectional view of the spindle assembly and sleeve of FIG. 3A.

FIG. 3A illustrates the sleeve 69 attached to the spindle shaft 27. The drawbar fluid supply passage 57, opening port fluid passages 77, and closing port fluid passages 77' are arranged on the cylindrical surface of the sleeve 69. A cross-sectional view of the sleeve 69, the spindle shaft 27, and the drawbar 31 is shown in FIG. 3B, with the drawbar 31 in the collet open position. An O-ring seal 98 is fitted in a recess 99 of the flange 65.

Figure 4A:
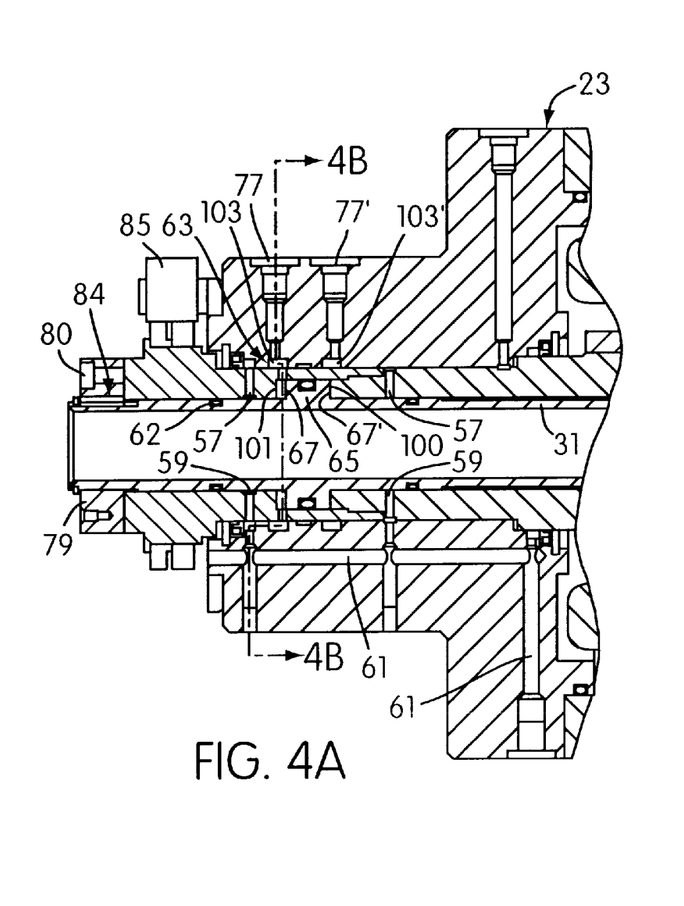
FIG. 4A is a detailed view of the spindle of FIG. 1A.

The hydraulic piston assembly 63 is shown in detail in FIG. 4A, which depicts the drawbar 31 again in the collet open position. Thus, the engagement surface 67' of the flange 65 is, in this position, disposed within the chamber 71 (see FIG. 4B) so that it is adjacent an end surface 100 of the spindle shaft 27, while the engagement surface 67 is spaced from a chamber surface 101 of the sleeve 69. It will be understood that the end surface 100 and chamber surface 101 each have an appropriate relief (not shown) formed thereon so that the respective engagement surfaces 67, 67', do not fit against them in a completely flush manner. Such recesses permit fluid pressure to develop between the respective engagement surfaces 67, 67' and the end surface 100 or chamber surface 101, so that the flange 65 can be displaced by the fluid pressure to move the drawbar 31 as desired. Those of skill in the art will recognize that such a relief may also be formed on engagement surfaces 67, 67'.

Figure 4B:
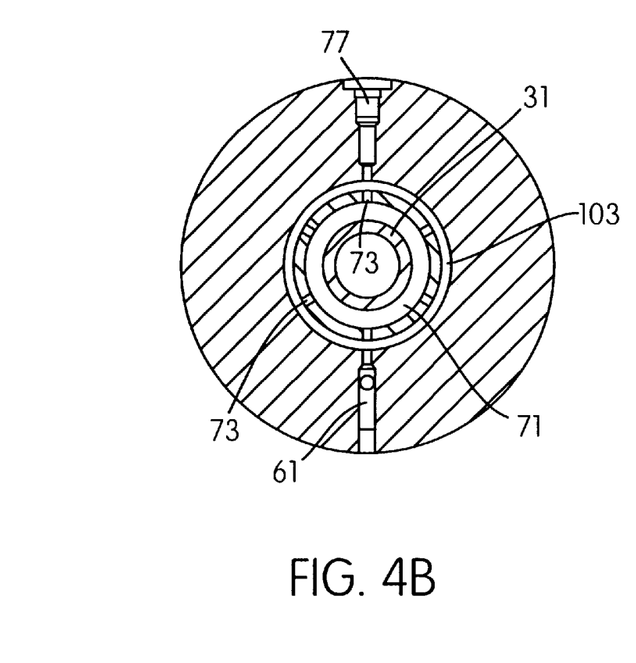
FIG. 4B is a transverse cross-sectional view taken along the lines 4B—4B of FIG. 4A.

A transverse cross-sectional view of the spindle 21 of FIG. 4A is depicted in FIG. 4B. The fluid passage 77 leads to an annular chamber 103, through which pressurized fluid flows into the opening ports 73 and into the chamber 71. A like annular chamber 103' is in communication with the fluid passage 77' and the closing ports 75. The fluid drain passage 61 is depicted in FIG. 4B positioned for draining fluid from the drawbar fluid drain passage 59 (see FIG. 4A).

Figure 5A:
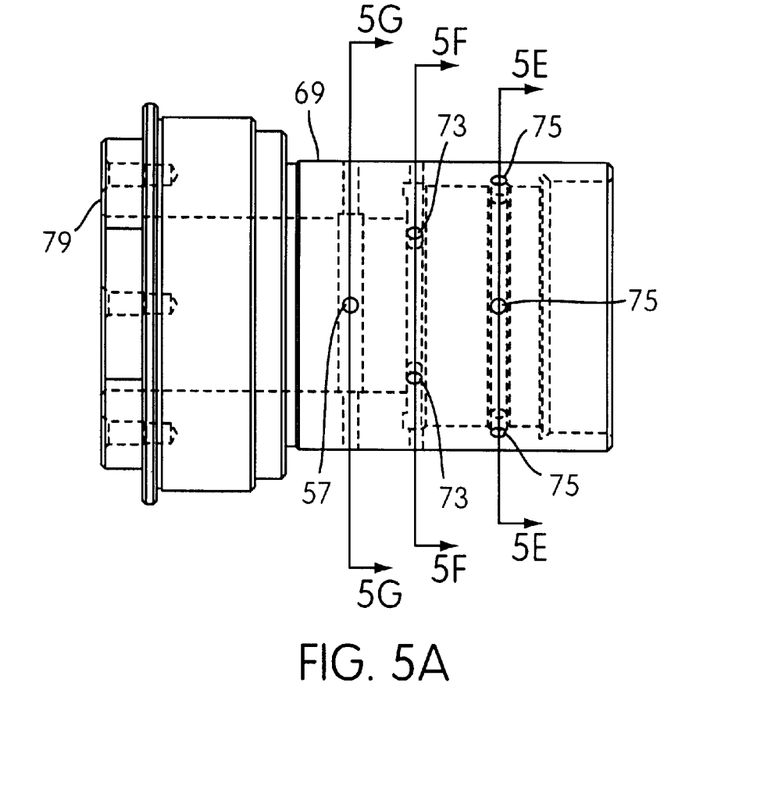
FIG. 5A is an elevational view of a sleeve in accordance with the present invention.
Figure 5B:
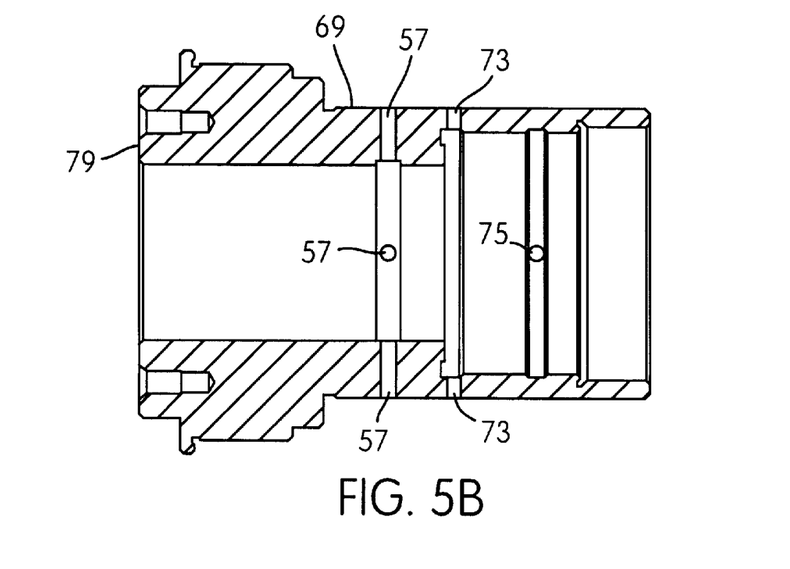
FIG. 5B is a cross-sectional view of the sleeve of FIG. 5A.

The sleeve 69 is shown in a detailed view in FIG. 5A, and it can be seen that the opening ports 73 are arranged in a radially-staggered orientation with respect to the closing ports 75. This arrangement inhibits the development of disadvantageous axial stress lines along the sleeve 69 by arranging the structurally weaker points around the opening ports 73 and the closing ports 75 in a radially staggered orientation. The distance between the weaker areas around the opening ports 73 and the closing ports 75 is also increased thereby. The sleeve 69 is shown in cross-section in FIG. 5B.

Figure 5C:
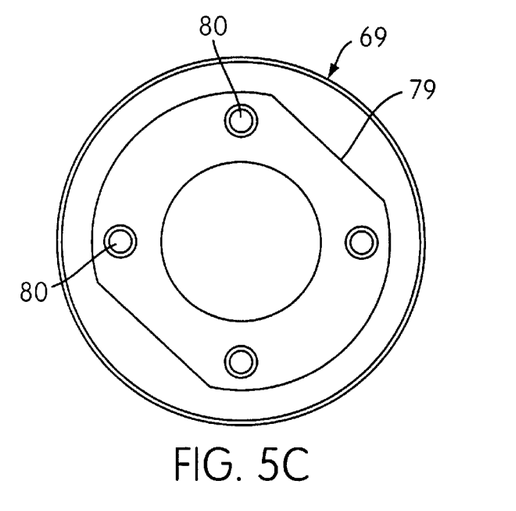
FIG. 5C is an elevational view of an end of the sleeve of FIG. 5A.
Figure 5D:
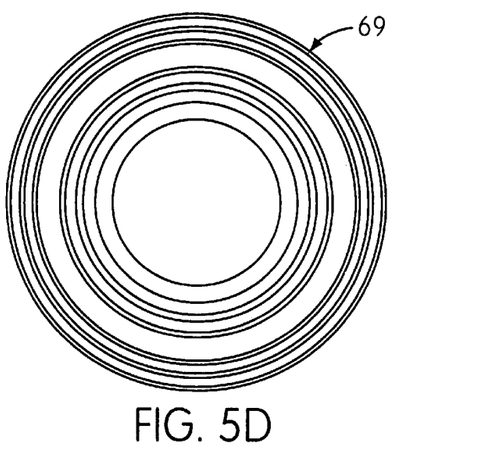
FIG. 5D is an elevational view of the other end of the sleeve of FIG. 5A.
Figure 5E:
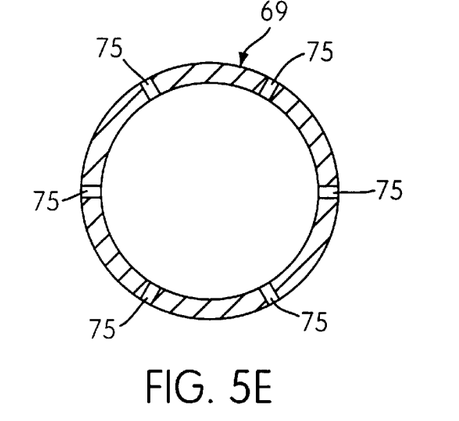
FIG. 5E is a transverse cross-sectional view taken along lines 5E—5E of FIG. 5A.
Figure 5F:
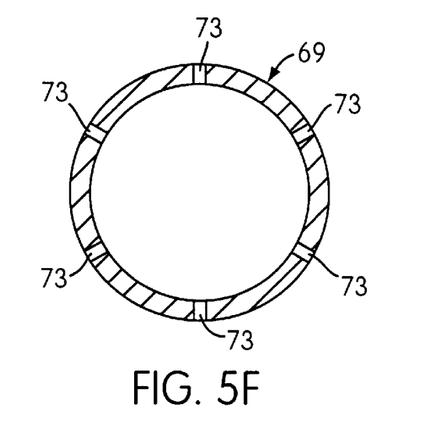
FIG. 5F is a transverse cross-sectional view taken along lines 5F—5F of FIG. 5A.
Figure 5G:
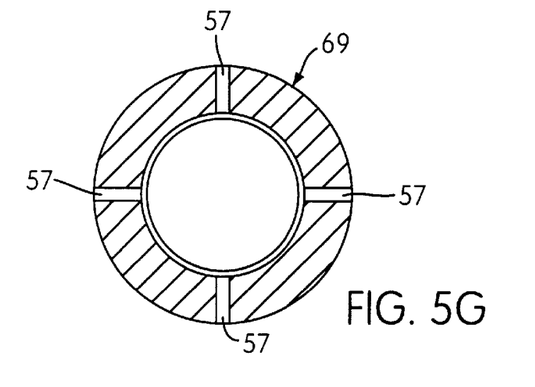
FIG. 5G is a transverse cross-sectional view taken along lines 5G—5G of FIG. 5A.

FIG. 5C depicts the sleeve 69 in an end elevational view of the knob 79 end of the sleeve 69, while FIG. 5D depicts the sleeve 69 in an end elevational view of the opposing end. The closing ports 75 are shown in a cross-sectional view of the sleeve 69 in FIG. 5E, while FIG. 5F depicts the opening ports 73 in a cross-sectional view of the sleeve 69. FIG. 5G shows the drawbar fluid supply passages 57 and the drawbar fluid drain passages 59. It will be understood that, depending upon the orientation of the sleeve 69 with respect to the fluid drain passages 61, one or more of the drawbar fluid passages 57, 59 could serve as either fluid supply passages or fluid drain passages.

The spindle 21 of the present invention provides convenient, reliable and accurate operating characteristics for its users. Installation of a collet 33 in the spindle 21 is easily accomplished through the following general steps.

The spindle 21 will be in a ready position with the collet key 89 held within the bore 87 by a set screw (not shown) and positioned so as to extend into the hollow interior of the spindle shaft 27 a predetermined distance, as is well-known in the art. The drawbar 31 will be in the collet open position shown in FIG. 1. The collet 33 will then be placed in the tapered contacting portion 37 of the spindle shaft 27, so that a groove (not shown) on the collet 33 engages the collet key 89.

With the knob 79 disengaged from the sleeve 69, the knob 79 can be turned by hand to engage the collet 33 in the threaded portion 35 of the drawbar 35. The knob 79 will then be attached to the sleeve 69 by the threaded fasteners 80, and the hydraulic piston assembly 63 can be engaged to move the drawbar 31 to the closed position as shown in FIG. 1B, thereby drawing the collet 33 against the tapered contacting portion 37 to close the collet 33. The drawing of the collet 33 tightly against the tapered contacting portion 37 provides locking action to hold the collet 33 in place, while engagement of the collet key 89 against the collet 33 also locks the spindle shaft 27, the drawbar 31, and the collet 33 together.

The spindle 21 can then be operated for machining or other purposes, and can accomplish such operations with a high level of performance as a result of the fluid thrust bearings 51, which enhance the accuracy and stability of the spindle 21. The present invention is thus well-suited for use in lathes, milling machines, and many other applications.

Performance is also enhanced in the preferred embodiment through the use of an integral drive motor, which eliminates the necessity for a belt drive or other method of transmitting rotational force to the spindle shaft 27. The integral drive motor 25 reduces inertial drag as compared to a belt drive arrangement, resulting in faster acceleration and increased responsiveness.

However, belt drive arrangements, geared drives, or other arrangements for transmitting rotational force to the spindle shaft 27 may be advantageous in some applications, for example retrofitting of existing devices, central drive motor arrangements, small-scale spindles, or other instances in which an integral drive motor is not desired. It will be understood that the scope of the present invention includes spindles used in such arrangements.

As is apparent from the spindle illustrated in the drawings and its variations as described above, the present invention provides several significant advantages over prior art devices. Convenient, easy, and secure installation and removal of mounting members such as collets and the like is provided, while the enhanced performance and stability of a fluid thrust bearing are also realized. The through-hole design of the preferred embodiment makes possible machining of a wide variety of stock sizes and configurations, which is highly advantageous in devices such as lathes and others. When desired, the use of an integral drive motor results in further increases in performance.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

Thus, it is to be understood that variations in the particular drive arrangement, actuating assembly, locking assembly, and radial bearings employed can be made without departing from the novel aspects of this inventions as defined in the claims.

What is claimed is:

1. A spindle for gripping and closing a mounting member, comprising:

A housing having a spindle assembly mounted therein, said spindle assembly including a first rotary member being capable of rotation about its longitudinal axis, and a second rotary member disposed about said first rotary member in coaxial relation and being capable of rotation about the longitudinal axis;

said first rotary member having a gripping portion for gripping the mounting member, and said second rotary member having a thrust surface and a contacting portion for contacting the mounting member;

a radial bearing for supporting said second rotary member for the rotational movement, and a fluid thrust bearing for axially supporting said thrust surface of said second rotary member;

one of said first and second rotary members being capable of axial movement relative to the other of said rotary members and having an engagement surface engageable by fluid pressure for causing axial movement of said one of said rotary members; and an actuating assembly constructed and arranged to selectively engage said engagement surface to move said one of said rotary members axially relative to said other of said rotary members, thereby drawing the mounting member against said contacting surface for closure.

2. The spindle of claim 1, further including an integral drive motor disposed in said housing for driving said spindle assembly, said motor having a first drive member mounted in said housing and a second drive member attached to said second rotary member for rotational movement therewith.

3. The spindle of claim 1, wherein said radial bearing comprises a fluid radial bearing.

4. The spindle of claim 3, wherein said fluid radial bearing comprises a self-compensating hydrostatic bearing.

5. The spindle of claim 1, wherein said first rotary member comprises a drawbar and said second rotary member comprises a spindle shaft.

6. The spindle of claim 5, wherein said drawbar comprises a through-hole drawbar.

7. The spindle of claim 1, wherein said first rotary member comprises said one of said rotary members.

8. The spindle of claim 1, further including a locking member arranged for selectively locking said second rotary member and the mounting member for unitary rotational movement.

9. The spindle of claim 5, further including a knob portion being releasably engageable for unitary rotational movement with said spindle shaft, and a slide member engaged in said knob portion and said drawbar for relative axial movement and unitary rotational movement of said knob portion and said drawbar.

10. The spindle of claim 1, wherein an annular flange is formed on said one of said rotary members, and said engagement surface and a second engagement surface engageable by fluid pressure are formed on said flange.

11. The spindle of claim 1, wherein said actuating assembly comprises a fluid pressure actuating assembly.

12. The spindle of claim 9, wherein an annular flange is formed on said one of said rotary members, and said engagement surface and a second engagement surface are formed on said flange, and wherein said actuating assembly includes a sleeve attached to said spindle shaft, said sleeve defining a chamber for receiving said flange therein for a range of axial movement within said chamber, said sleeve further defining an opening port for supplying fluid to said chamber for moving said flange in a mounting member opening direction, and a closing port for supplying fluid to said chamber for moving said flange in a mounting member closing direction.

13. The spindle of claim 12, wherein said closing port is disposed in relation to said opening port in radially staggered orientation.

14. The spindle of claim 12, wherein said sleeve is releasably attached to said spindle shaft.

15. A spindle for gripping and closing a collet, comprising:

a housing having a radial fluid bearing disposed therein;

a hollow spindle shaft rotationally supported in said radial bearing for rotation about its longitudinal axis and having a pair of thrust surfaces and a collet contacting portion;

a through-hole drawbar received in the hollow interior of said spindle shaft in coaxial relation thereto for rotation about the axis and axial movement relative to said spindle shaft, said drawbar having a gripping portion for gripping the collet, and an annular flange having an engagement surface;

an integral electric drive motor disposed in said housing for driving said spindle shaft and including a rotor attached to said spindle shaft for rotational movement therewith and a stator mounted about said rotor;

a locking member arranged for selectively locking said spindle shaft and the collet for unitary rotational movement;

a pair of fluid thrust bearings each supporting one of said thrust surfaces; and a fluid pressure piston assembly mounted about said flange to selectively engage said engagement surface to move said drawbar axially relative to said spindle shaft, thereby drawing the collet against said contacting surface for closure.

16. A spindle for gripping and closing a mounting member, comprising:

A housing having a spindle assembly mounted therein, said spindle assembly including a through-hole drawbar being capable of rotation about its longitudinal axis, and a spindle shaft and being disposed about said drawbar in coaxial relation and being capable of rotation about the longitudinal axis;

said spindle shaft having a central bore having a flow of fluid therein, and said drawbar being supported in said bore in said flow of fluid;

said drawbar having a gripping portion for gripping the mounting member, and said spindle shaft having a thrust surface and a contacting portion for contacting the mounting member;

a radial bearing for supporting said spindle shaft for the rotational movement, and a fluid thrust bearing for axially supporting said thrust surface of said spindle shaft;

said drawbar being capable of axial movement relative to said spindle shaft and having an engagement surface engageable for causing axial movement of said drawbar; and an actuating assembly constructed and arranged to selectively engage said engagement surface to move said one of said drawbar axially relative to said spindle shaft, thereby drawing the mounting member against said contacting surface for closure.

17. The spindle of claim 16, further including an integral drive motor disposed in said housing for driving said spindle assembly, said motor having a first drive member mounted in said housing and a second drive member attached to said spindle shaft for rotational movement therewith.

18. The spindle of claim 16, wherein said radial bearing comprises a fluid radial bearing.

19. The spindle of claim 18, wherein said fluid radial bearing comprises a self-compensating hydrostatic bearing.

20. The spindle of claim 16, further including a locking member arranged for selectively locking said spindle shaft and the mounting member for unitary rotational movement.

21. The spindle of claim 16, further including a knob portion being releasably engageable for unitary rotational movement with said spindle shaft, and a slide member engaged in said knob portion and said drawbar for relative axial movement and unitary rotational movement of said knob portion and said drawbar.

22. The spindle of claim 16, wherein said actuating assembly comprises a fluid pressure actuating assembly, and an annular flange is formed on said drawbar, said engagement surface and a second engagement surface being formed on said flange.

23. The spindle of claim 22, wherein said actuating assembly includes a sleeve attached to said spindle shaft, said sleeve defining a chamber for receiving said flange therein for a range of axial movement within said chamber, said sleeve further defining an opening port for supplying fluid to said chamber for moving said flange in a mounting member opening direction, and a closing port for supplying fluid to said chamber for moving said flange in a mounting member closing direction.

24. The spindle of claim 23, wherein said closing port is disposed in relation to said opening port in radially staggered orientation.

25. The spindle of claim 23, wherein said sleeve is releasably attached to said spindle shaft.

* * * * *